(No Model.)
A. G. MORRIS.
OYSTER FRIER.
No. 372,380. Patented Nov. 1, 1887.
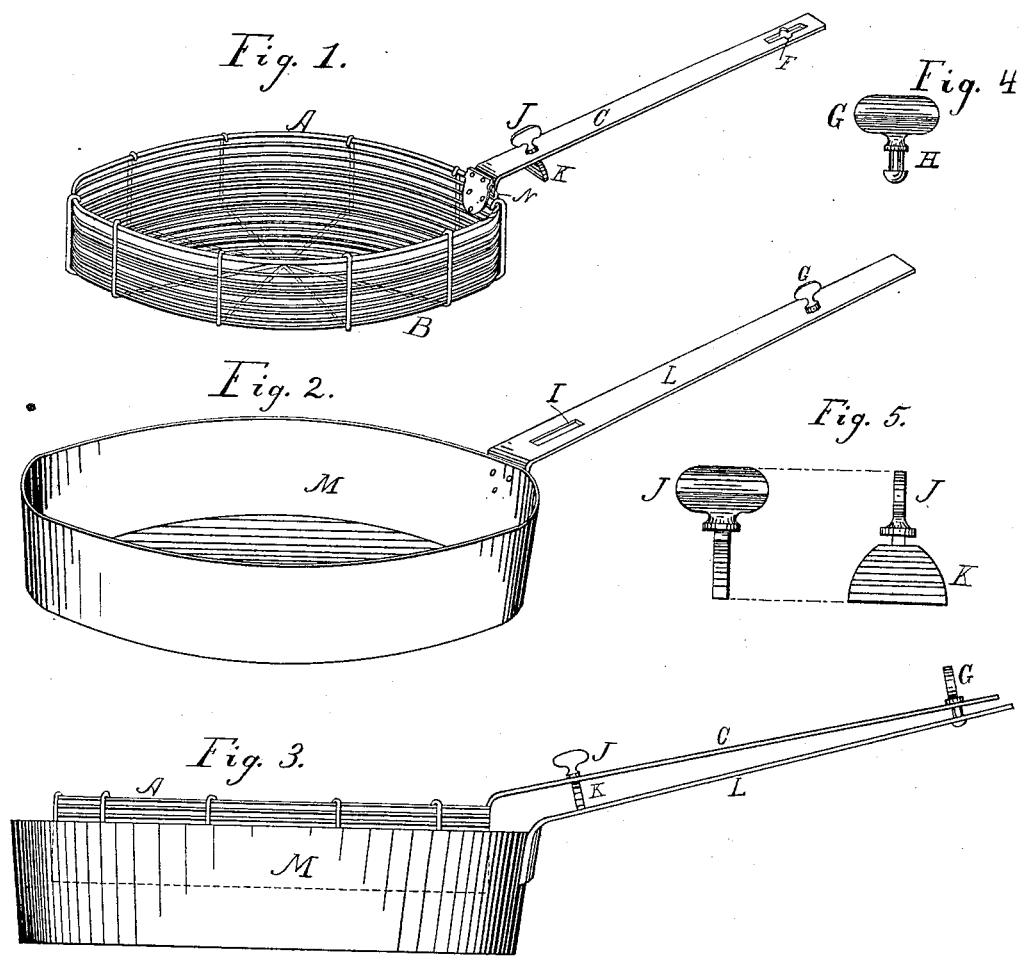
WITNESSES:
INVENTOR
ATTORNEY

UNITED STATES PATENT OFFICE.

ARTHUR G. MORRIS, OF CHICAGO, ILLINOIS.

OYSTER-FRIER.

SPECIFICATION forming part of Letters Patent No. 372,380, dated November 1, 1887.

Application filed June 13, 1887. Serial No. 241,236. (No model.)

*To all whom it may concern:*

Be it known that I, ARTHUR G. MORRIS, a subject of the Queen of Great Britain, a citizen of England, and a resident of Chicago, county of Cook, and State of Illinois, have invented new and useful Improvements in Oyster-Friers, of which the following is a specification, reference being had to the accompanying drawings, illustrating the invention, in which—

Figure 1 is a perspective representation of the open-work dish which is employed in connection with a pan, but removed therefrom. Fig. 2 represents the pan with which the dish is employed; Fig. 3, an elevation of the frier complete. Figs. 4 and 5 are detail portions thereof enlarged.

The purpose of this invention is to provide simple and convenient means for frying oysters or other dishes of like kind; and the nature thereof consists of a suitable pan to hold the lard, in which is placed an open-work dish to hold the oysters and keep them from the bottom of the pan which contains the hot lard. The ends of the handles to the two dishes are united by a detachable thumb-clamp. Farther down on the handle, to the open-work dish, is affixed a stud, which may be turned so that its lower end may pass through a slot in the lower handle and permit the open-work dish to pass down into the slot below to put the oysters into the lard, and so turned that the lower end of the stud may be brought up to rest on the handle to the low dish, and thus bring the oysters out of the lard for the convenience of removing them, as herein fully described and shown.

A represents the bottom, and B the periphery, of an open-work dish, which is more conveniently made of wire, with the connections secured to withstand the effect of the hot lard. A handle, C, is secured to this dish at N. The dish to contain the hot lard is shown at M, and it is provided with a handle, L, which is provided with a thumb-clamp, G H, the shank H of which passes through a slot, F, in the handle C, and by turning the clamp half around it secures the ends of the handles together, as shown at Fig. 3. A stud, J K, is affixed to turn in the handle C, and longitudinally in the handle L is formed a slot, I, through which the part K of the stud may pass to let the dish A B down into the hot lard in dish M. The part K of the stud, being removed from the slot I and turned crosswise with the handle L, will rest on the same and hold the dish A B up out of the lard for the removal of the oysters.

I claim as new and desire to secure by Letters Patent—

An oyster-frier consisting of the open work dish A B, provided with the handle C, stud J K, and slot F, in combination with the dish M, provided with the handle L, slot I, and clamp connection G, as set forth.

ARTHUR G. MORRIS.

Witnesses:
  G. L. CHAPIN,
  WILLIAM CLANCY.